(12) United States Patent
Ray et al.

(10) Patent No.: US 7,197,745 B2
(45) Date of Patent: Mar. 27, 2007

(54) USER DEBUGGER FOR USE ON PROCESSES RUNNING IN A HIGH ASSURANCE KERNEL IN AN OPERATING SYSTEM

(75) Inventors: Kenneth D. Ray, Seattle, WA (US); Bryan Mark Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 10/428,678

(22) Filed: May 2, 2003

(65) Prior Publication Data

US 2004/0221269 A1 Nov. 4, 2004

(51) Int. Cl.
 G06F 9/44 (2006.01)
(52) U.S. Cl. ...................................... 717/127
(58) Field of Classification Search ................ 717/124, 717/127
See application file for complete search history.

(56) References Cited

U.S. PATENT DOCUMENTS

| | | | |
|---|---|---|---|
| 6,282,701 B1 * | 8/2001 | Wygodny et al. | 717/125 |
| 6,941,492 B1 * | 9/2005 | Ezra et al. | 714/38 |
| 2004/0128585 A1 * | 7/2004 | Hind et al. | 714/38 |

OTHER PUBLICATIONS

Zandy et al., "Process Hijacking", High Performance Distributed Computing, 1999. Proceedings. The Eighth International Symposium, p. 177-184.*

Aguilera, M.K. et al., "Performance Debugging for Distributed Systems of Black Boxes", *ACM Symposium on Operating Systems Principles, Proceedings of the nineteenth (19th)ACM Symposium on Operating Systems Principles*, 2003, 74-89.

Elshoff, I.J. P., "A Distributed Debugger for Amoeba", *Workshop on Parallel & Distributed Debugging, Proceedings of the 1988 ACM SIGPLAN and SIGOPS Workshop on Parallel and Distributed Debugging*, 1989, 1-10.

Satyanarayanan, M. et al., "Transparent Logging as a Technique for Debugging Complex Distributed Systems", *Proceedings of the 5th Workshop on ACM SIGOPS European Workshop: Models and Paradigms for Distributed Systems Structuring*, 1992, 1-3.

Whittaker, J.A. et al., "Black Box Debugging", *Queue*, 2003, 1(9), 68-74.

* cited by examiner

*Primary Examiner*—Wei Zhen
*Assistant Examiner*—Philip Wang
(74) *Attorney, Agent, or Firm*—Woodcock Washburn LLP

(57) ABSTRACT

The debugging of bifurcated processes allows a debugger to: (1) read and/or write process memory for the debuggee process; (2) get and/or set the thread context for the debuggee process threads; (3) control running threads of the debuggee process; and (4) handle debug events. Bifurcated processes include a shadow process whereby threads are scheduled and a corresponding work process which handles the actual work to be done by the process. The reading and writing of process memory and the getting and setting of the context is done by passing the request to the execution environment in which the work process is executing. The control of threads of the debuggee process is handled by requesting that the execution environment in which the shadow process is running perform the request. Debug events are routed to the debugger from the execution environment in which the work process is executing.

31 Claims, 6 Drawing Sheets

USER DEBUGGER FOR USE ON PROCESSES RUNNING IN A HIGH ASSURANCE KERNEL IN AN OPERATING SYSTEM

FIELD OF THE INVENTION

The present invention relates generally to the field of debuggers. More particularly, the invention relates to the use of plural execution environments in tandem, and provides techniques that support the use of a debugger running in a first of the execution environments to debug a process running in a second of the execution environments.

BACKGROUND OF THE INVENTION

Generally, a debugger is a tool designed to help find errors in another program by allowing a user to step through the program, examine data, and check conditions. This is done in order to allow analysis of a program in its running state, thereby providing a tool for troubleshooting problems and/or otherwise improving the performance of the program.

A debugger works by "attaching" to a particular process (the "debuggee") and, typically, by performing some or all of the following operations, either under the control of a user or in response to calls or conditions in the debuggee process:

(1) read and/or write process memory for the debuggee process;

(2) get and/or set the thread context for the debuggee process;

(3) control running threads of the debuggee process; and (4) handle debug events that occur in the debuggee process.

The debugger can not directly perform these functions for or on the debuggee, since in general operating systems protect processes from each other, including their specific data, registers, control information, and any other like state of a given process. For example, operating systems do not generally allow one process to access process memory or thread context of another process. Instead of such direct access between threads, the kernel of a given operating system, or some other privileged software acting on behalf or instead of the kernel, mediates between the debugger process and debuggee process. For example, when a debugger process would like to get the context for a thread of the debuggee process, the kernel first receives the request, verifies that the debugger has the correct permissions to perform the requested action, and, if it does, provides the debugger with the requested portions of the debuggee process' thread context (for a read) or writes the requested data to the debuggee process' thread context (for a write).

Remote debugging is used when a debugger is run on a first system and the program being debugged ("debuggee" program) is running on a second system. In order to facilitate this remote debugging, a "debug stub" also runs on the second system. Remote debugging allows the debugger user interface to run on the first system in order to debug the debuggee program, which provides flexibility for the user of the debugger program where, for example, running the debugger program on the second system is not convenient or feasible. The debug stub serves as a surrogate for the debugger on the second system. When the debugger wishes to get the context for a thread of the debuggee process on the second system, for example, the request is passed to the debug stub, which communicates with the kernel on the second system and obtains the information.

However, it may be desirable to allow two execution environments (either in a single computing environment or in more than one computing environment) to interact with each other while preventing events at one of the execution environments from undermining the ability of another to behave as it is expected to behave. For example, two or more operating systems that run on a single machine are examples of execution environments that may need to interact with each other in a single computing environment. If this is the case, and one of the execution environments includes a high assurance component whose behavioral specification requires it not to "leak" information outside of itself, it can be appreciated that such a high assurance component (such as a high assurance operating system) cannot trust another kernel with the task of dispatching a thread, since the act of dispatching the thread would necessarily give the dispatching operating system access to the thread's register contents. Additionally, there are various other types of attacks to an operating system that are based on scheduling threads to run at inappropriate times (e.g., running threads that have been designated as not runnable, or running a thread that is already running).

In such a case, it may be desirable for a first operating system to make scheduling decisions about certain of the second (high assurance) operating system's processes (e.g., how to account for a thread's priority), but the ultimate dispatch of the second operating system's processes is performed by the second operating system—which can protect itself from an attack by refusing to perform the dispatch if conditions are not appropriate to run the thread. For processes that are to work in this bifurcated manner ("bifurcated processes"), a "work process" is created in the second operating system, and a corresponding "shadow process" is created in the first operating system. Where processes include multiple threads, multiple bifurcated threads are created. The thread scheduler of the first operating system is used to schedule the threads of the shadow processes by scheduling the shadow process to run.

Whenever a thread of a shadow process is dispatched, the ultimate effect is to run the corresponding thread of the corresponding work process in the second operating system. The mechanism by which the work process is invoked is that every shadow process contains an instruction to change context to the second operating system with a request that the corresponding work process be run. The threads in the second operating system are referred to as work threads because these are the threads that will actually perform the substantive work that needs to be done in the second operating system. The work threads are in contrast to the shadow threads, whose function is to be schedulable by the first operating system's scheduler so that they can invoke the work threads. In this way, the use of the first operating system cannot cause the high assurance second operating system to behave in an unintended manner by incorrectly scheduling operating system's threads.

Shadow threads may be created by an agent of the second operating system that executes inside of the first operating system. This agent is an ordinary thread or process running under the first operating system. The agent communicates with the second operating system. When the second operating system creates a thread, it informs the agent that the new thread has been created, and also informs the agent of the new thread's internal thread ID. The agent then instantiates a shadow thread in the first operating system. The shadow thread knows the thread ID that has been communicated to the agent. When the shadow thread runs and invokes a context switch back to the second operating system, the shadow thread uses the thread ID to instruct the second operating system which thread should be started.

However, because of the high assurance nature of one environment, it may not be advisable to allow a debugging process running on one operating system to debug a process on a high assurance second execution environment. A debugger may not be available on the high assurance environment, or it may be inadvisable to allow the use of such a debugger to maintain the assured nature of the environment. Similarly, a debug stub may be unavailable for an environment or it may not be advisable to use a debug stub in an environment in order to maintain the assured nature of the environment. Where shadow threads are being used, the traditional methods of remote debugging with a debug stub can not be used, as each process is scheduled in one environment but the context and other process information is stored in the high assurance second execution environment. However, debugging is an important tool.

In view of the foregoing there is a need for a system that overcomes the drawbacks of the prior art.

SUMMARY OF THE INVENTION

The present invention provides a debugger running in a first execution environment for use on processes running in a high assurance second execution environment. A first execution environment performs scheduling for a bifurcated process executing in a high assurance second execution environment by having a shadow process run in the first execution environment which can be scheduled, and a corresponding work process in the high assurance second environment which performs the work when the shadow process is scheduled time by the first execution environment. Debugging is performed by a debugger which has debug access to the first execution environment (either a debugger process running in the first execution environment or remotely, where a debugger process is running in a third environment but a debug stub is running in the first execution environment).

The debugger attaches to the shadow process, and, in one embodiment of the invention, the "shadow" nature of the shadow process (the fact that the work is performed by a corresponding work process in the second execution environment) is transparent to the debugger. All debugger inputs and requests (read and/or write process memory; get and/or set thread context for the threads of the process; control running threads; handle debug events) appear to the debugger as they would if the shadow process were the debuggee process.

However, debugger is concerned with the process memory and thread context for the work process running in the second execution environment, and not that of the shadow process. In one embodiment, in order for the debugger process to read and/or write process memory or to get and/or set thread context for the process, the kernel of the first execution environment receives the debugger's request for this information for the shadow process. The kernel of the first execution environment analyzes the request, and first makes the standard determination of whether the request is from a debugger with privileges to debug the debuggee process, for which it is requesting information. If it is, the kernel of the first execution environment determines whether the debuggee process is a shadow process. If the debuggee process is a shadow process, the kernel of the first execution environment passes the request to the kernel of the second execution environment, which, first, performs a security check to determine if the debugger process of the first execution environment has the authorization to debug the debuggee process in the second execution environment, and, second, performs the requested read and/or write for the work process's process memory or performs the requested get and/or set thread context for the work thread.

Where the debugger's request relates to the control of running threads, for example where the debugger needs to signal, stop, or terminate threads, the debugger request is again made regarding the shadow thread to the kernel in the first execution environment. However, because the shadow thread is the thread which is used for scheduling the work thread, the request can remain in the first execution environment. After determining that the debugger process had the requisite permissions with respect to the shadow thread, the kernel in the first execution environment simply performs the request on the shadow thread. Because the shadow thread is used to schedule the work thread, a signal to stop, for example, which is made by the debugger to the shadow thread is transmitted to the work thread.

Additionally, all events occurring in the debuggee process must be reported to the debugger process. For example, for SEH (structured exception handling), exceptions can occur in any process. These exceptions are first caught by the kernel (or controlling privileged software), for that given process. In most systems the kernel handles these exceptions in a structured manner given both the process and a debugger, if present, the opportunity to gracefully handle the exception. Specifically, the kernel might, in turn first calls the debugger, if present (first chance debugging), second, passes the exception to the exception handler of the process in question, if the exception handler for that process is present, third, pass the results to the debugger, if present (second chance debugging), and fourth, if the exception has still not been adequately handled, terminate the process. In one embodiment of this invention a shadow process is running on a first execution environment and a corresponding work process is running on a second execution environment, such exceptions may occur in the work process and be reported to the kernel in the second execution environment on which the work process is executing. When this occurs, if the debugger is attached to the shadow process, and the kernel in the second execution environment has determined that the debugger has sufficient authorization to debug the work process, the kernel in the second execution environment passes the exception to the kernel in the first execution environment for communication to the debugger attached to the shadow process, as if the exception has happened for the shadow process.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

When two operating systems run side-by-side on a single machine, they may need to engage in certain types of interaction with each other. One such interaction involves the use of bifurcated processes. The present invention provides techniques that support the debugging of such bifurcated processes.

Exemplary Computing Arrangement

Figure 1:
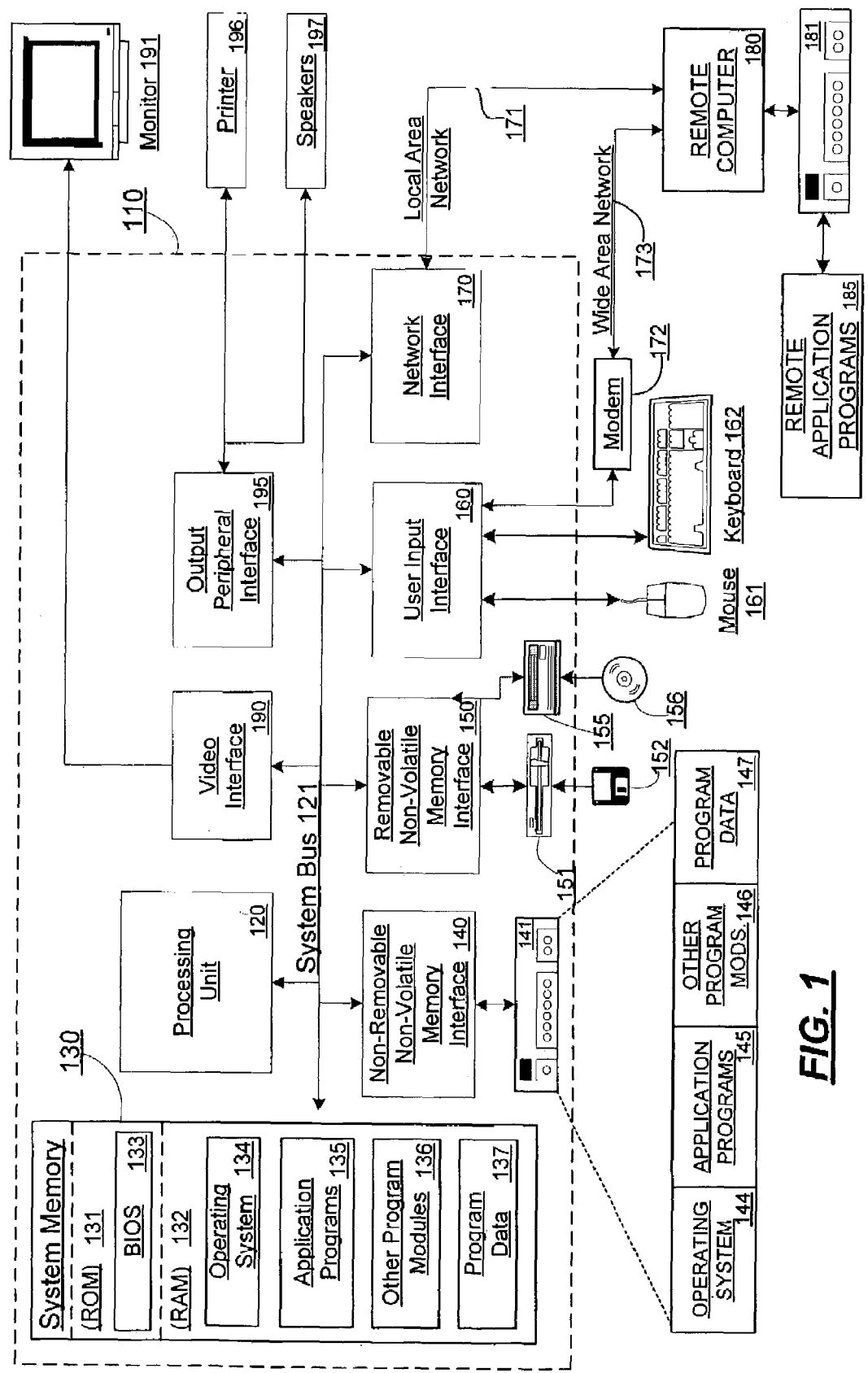
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those implemented on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Execution Environments on a Single Machine

Figure 2:
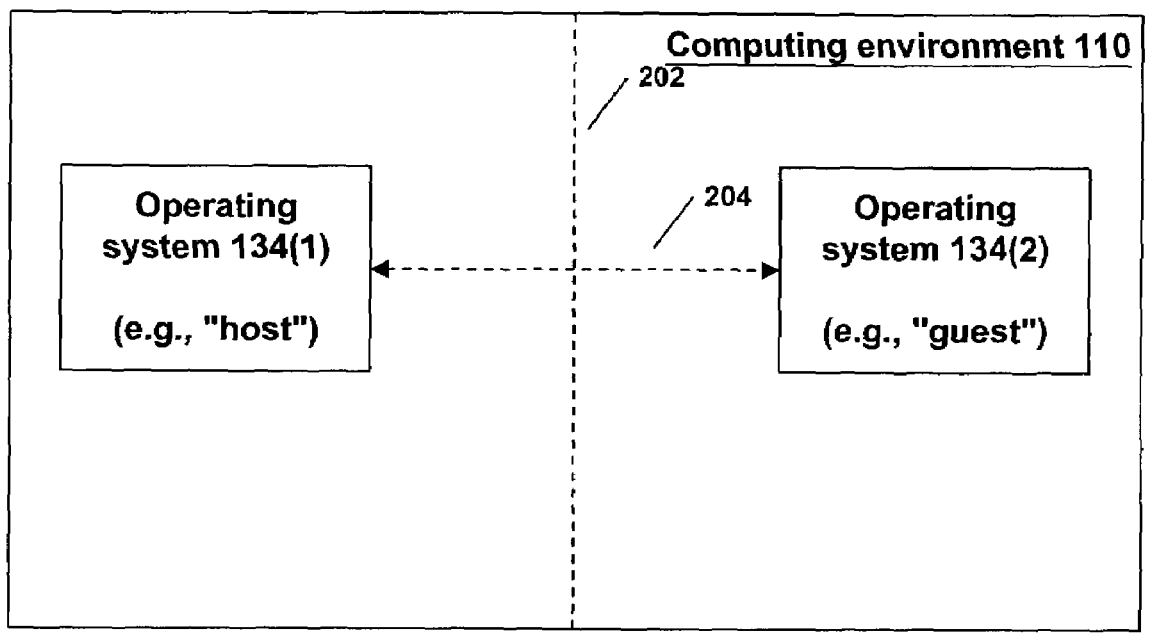
FIG. 2 is a block diagram two exemplary execution environments that maintain some interaction with each other and some separation from each other.

Two operating systems can execute side-by-side on a single computing device. FIG. 2 shows a system in which two operating systems 134(1) and 134(2) execute on a single computer (computing environment 110.) Some type of logical separation 202 exists between operating systems 134(1) and 134(2), such that a certain amount of interaction 204 is permitted between operating systems 134(1) and 134(2), while still allowing at least one of the operating systems to be protected against events that originate in the other operating system.

Operating system 134(2) may be a "high-assurance" operating system, the kernel of which will be referred to herein as a "nexus." A "high assurance" operating system is one that provides a certain level of assurance as to its behavior. For example, a nexus might be employed to work with secret information (e.g., cryptographic keys, etc.) that should not be divulged, by utilizing a curtained memory that is guaranteed not to leak information to the world outside of the nexus, and by permitting only certain certified applications to execute under the nexus and to access the curtained memory. Since the expectation that the nexus will behave according to its specification may be higher than the expectations imposed on the main operating system, the nexus should not interact with the main operating system in any way that would allow events happening at the main operating system to compromise the behavior of the nexus.

When the kernel of operating system 134(2) is a nexus, it is desirable to construct separation 202 such that operating system 134(2) can interact with operating system 134(1) in order to borrow operating system 134(1)'s infrastructure, while still allowing operating system 134(2) to protect itself from actions (either malicious or innocent) that arise at operating system 134(1) and might cause operating system 134(2) to behave in a manner contrary to its behavioral specifications. (It will be understood, however, that the invention is not limited to the case where the kernel of operating system 134(2) is a nexus.) Techniques are disclosed herein that allows separation 202 to be constructed so as to allow for this balance of interaction and protection.

Debugging in Plural Computing Environments with Shadow and Work Threads

As described above, it may be desirable to allow two execution environments (either on a single machine or on more than one machine) to interact with each other while preventing events at one of the execution environments from undermining the ability of another to behave as it is expected to behave. For example, as described above, one of the execution environments may be high security and contain a nexus. In this case and other plural computing environments, it may be useful to bifurcate threads, so the nexus does not need to contain a thread scheduler for these threads. This allows the nexus to be smaller and simpler, reducing the possibility that secure information may be leaked. Bifurcated threads consist of a shadow thread in a first execution environment, which will be scheduled by the scheduler of the first execution environment, and a work thread in a second execution environment, which is associated with the actual process memory and thread context for the thread and actually performs the work associated with the bifurcated thread. The scheduler of the first execution environment schedules the shadow thread as it would any other thread in the first execution environment.

Just as processes may involve a multiplicity of threads, a bifurcated process may use more than one thread. Each of the threads of a bifurcated process will have a work thread in the second operating system and a corresponding shadow thread in the first execution environment.

Figure 3:
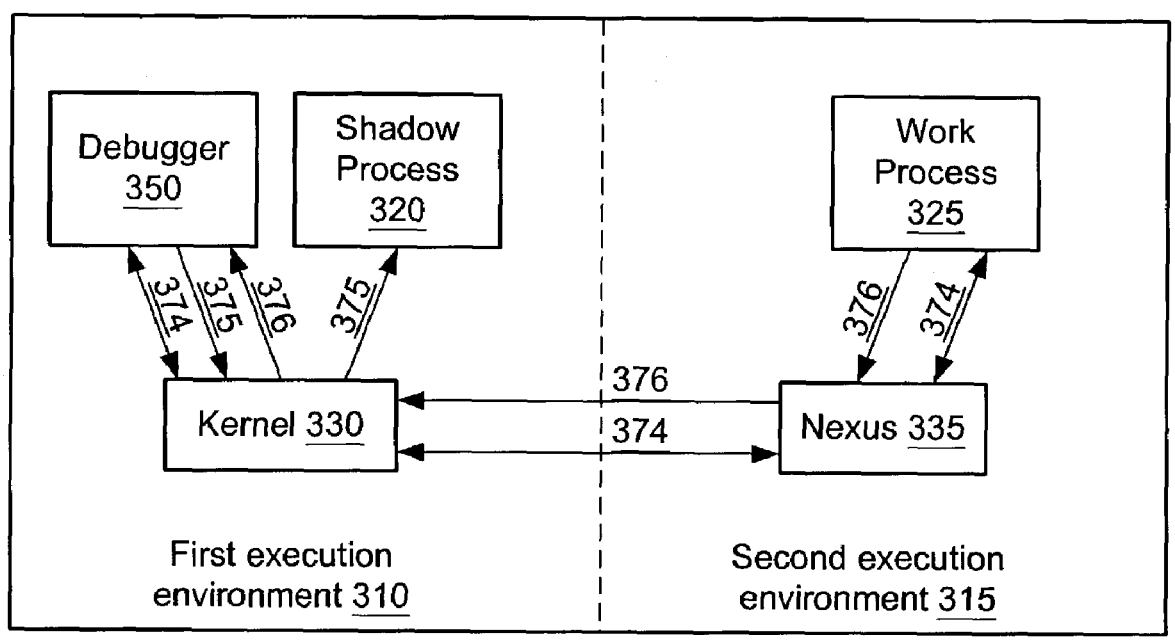
FIG. 3 is a block diagram of an exemplary environment in which debugging is occurring on a bifurcated thread according to the present invention.

In order to debug bifurcated programs, as shown in FIG. 3, a debugger 350 runs on the first execution environment 310. While debugger 350 is depicted in FIG. 3 as a process running in first execution environment 310, the invention is not so limited, and any debugger which can act on processes in first execution environment 310 is contemplated. For example, a remote debugger may be used in combination with a debug stub in the first execution environment.

The debugger 350 attaches to the shadow process 320, and interacts with the shadow process 320 and the kernel 330 of first execution environment 310. Shadow process 320 is the shadow process of a bifurcated process, and the companion to shadow process 320 is work process 325, which runs on nexus 335 in second execution environment 315. While in FIG. 3, a nexus 335 is shown in second execution environment 315 implying that second execution environment 315 is a high assurance execution environment as described above, the invention is not limited to systems which include a high assurance execution environment. Shadow process 320 is scheduled by the scheduler of the first execution environment 310 and, when it runs, simply performs a context switch to work process 325. The bifurcated process can be thought of, for scheduling purposes, as shadow process 320. In first execution environment 310 there may be debugging infrastructure which provides debugging information regarding shadow process 320, such as how frequently shadow process 320 runs, how frequently and how shadow process 320 fails/crashes and in what ways, and other statistics regarding the performance of shadow process 320 in first execution environment 310.

However, while shadow process 320 is a process with its own context and process memory, the actual work for the process conceptually bifurcated into shadow process 320 and work process 325 is performed by work process 325. Therefore, to debug this bifurcated process, according to the present invention, the process state (thread contexts and process memory) for work process 325 is provided to the debugger 350, as is notification of debug events occurring in work process 325.

Figure 4:
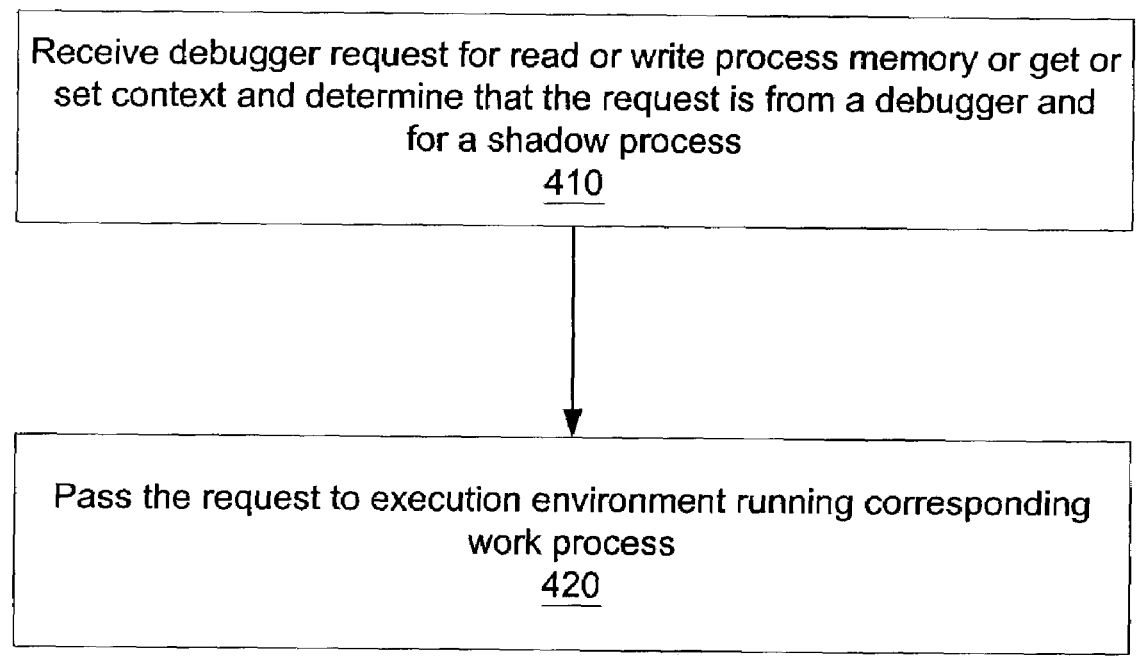
FIG. 4 is a flow diagram of a process of responding to a debugging request according to one embodiment of the present invention.

As shown in FIG. 3, when debugger 350 performs a read process memory request, a write process memory request, a get thread context request, or a set thread context request, debugger 350 sends this request to kernel 330. The request is directed towards shadow process 320. As shown in FIG. 4, upon receiving such a request, the kernel 330 first makes a determination 410 that the target of the request is a shadow process 320, and that the entity making the request is a debugger. When this determination has been made, the kernel 330 passes 420 the request to nexus 335 to be performed on work thread 325. The response, if any, to the request is returned to debugger 350 through kernel 330. In one embodiment, debugger 350 has no information that the thread it is debugging is, in fact, a bifurcated thread and that its requests are directed towards a shadow thread. The path of these requests is indicated in FIG. 3 by request path 374.

Figure 5:
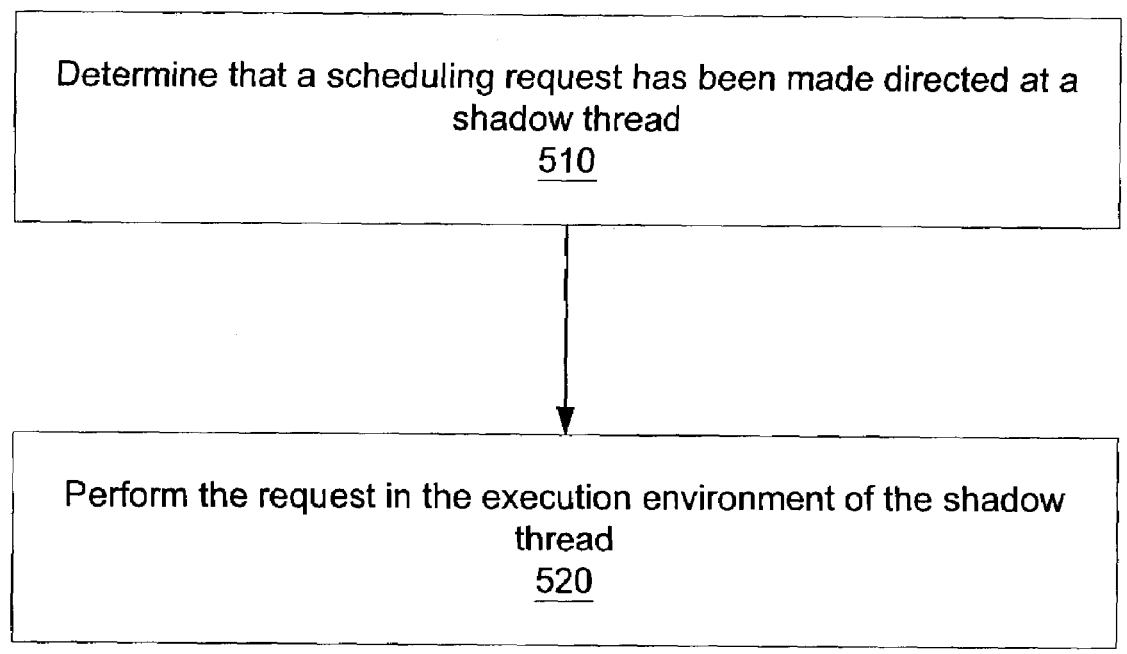
FIG. 5 s a flow diagram of a process of responding to a debugging request according to one embodiment of the present invention.

While the thread context and process memory for the bifurcated process are the thread context and process memory of work thread 325, scheduling is performed in the first execution environment 310. Thus, as shown in FIG. 5, when a request is made by the debugger 350 to control the running threads of the bifurcated process (the request directed by the debugger at shadow thread 320) the kernel 330 determines 510 that the debugger 350 has made a scheduling request directed at shadow thread 320. The request is performed 520 in the first execution environment 310 as it would be if shadow thread 320 were not a shadow thread. The requests of the debugger 350 to signal, stop, or terminate the thread are performed on shadow thread 320. Because of the relationship between shadow thread 320 and work thread 325, these actions affect work thread 325. The path of these requests is indicated in FIG. 3 by request path 375.

Figure 6:
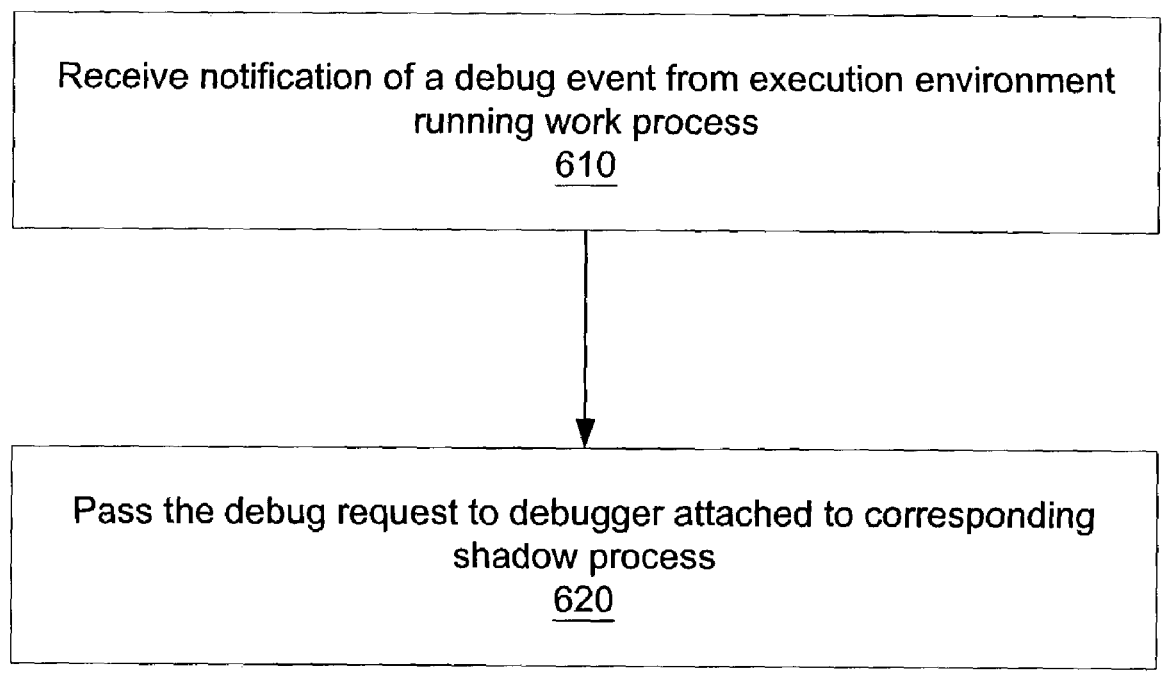
FIG. 6 is a flow diagram of a process of responding to a debugging request according to one embodiment of the present invention.

When in the execution of work thread 325, a debug event occurs, notification of this debug event will be made to nexus 335. After checking for authorization, nexus 335 sends notification of the debug event to kernel 330. As shown in FIG. 6, such a notification is received 610 by kernel 330. Because debugger 350 is attached to the shadow thread 320 corresponding to the work thread 325 which generated the debug event notification, the notification is passed 620 to debugger 350. The path of this notification is indicated in FIG. 3 by notification path 376. A debug port may exist for threads on in the first execution environment 310. Such a debug port is a message queue associated with the process which collects debug event notifications and notifications of other events for the process. Where a debug port exists for shadow thread 320, these notifications for work thread 325 will be collected in the debug port 376.

The nexus 335 can control which of the work threads running on nexus 335 can be debugged. For example, it may have a digest which identifies each work process running on nexus 335 and indicates which of them may be debugged.

The kernel 330 maintains information about which processes running in first execution environment are shadow processes. In one embodiment, a symbol cache is maintained for kernel 330 for each bifurcated process in order to allow a debugger to attach with the correct information about symbols for the process.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for facilitating the debugging of a bifurcated process by a debugger in a first execution environment, where said process is scheduled using a shadow process running in said first execution environment and where said bifurcated process is executed using a work process running in a second execution environment, wherein said first execution environment comprises a scheduler being adapted to schedule and dispatch a plurality of first threads for execution on a first processor; and wherein said second execution environment is adapted to dispatch a plurality of second threads for execution on a second processor; said second execution environment being further adapted to request, for each of said second threads, creation of a corresponding one of said first threads, each of the first threads comprising an instruction switch to said second execution environment with a request to invoke the first thread's corresponding second thread, said method comprising:

determining that a request has been made by the debugger to access process memory for said bifurcated process;

passing said request to said second execution environment; and performing said request in said second execution environment.

2. The method of claim 1, where said step of determining that a request has been made by the debugger to access process memory for said bifurcated process comprises:

verifying that said debugger has the required authorization with respect to said bifurcated process.

3. The method of claim 1, where said step of determining that a request has been made by the debugger to access process memory for said bifurcated process comprises:

determining that a request has been made to access process memory for said shadow process.

4. The method of claim 1 where said request comprises a request to read process memory.

5. The method of claim 1 where said request comprises a request to write process memory.

6. A method for facilitating the debugging of a bifurcated process by a debugger in a first execution environment, where said process is scheduled using a shadow process running in said first execution environment, and where said bifurcated process is executed using a work process running in a second execution environment, wherein said first execution environment comprises a scheduler being adapted to schedule and dispatch a plurality of first threads for execution on a first processor; and wherein said second execution environment is adapted to dispatch a plurality of second threads for execution on a second processor; said second execution environment being further adapted to request, for each of said second threads, creation of a corresponding one of said first threads, each of the first threads comprising an instruction to switch to said second execution environment with a request to invoke the first thread's corresponding second thread, said method comprising: determining that a request has been made by the debugger to access a context for said bifurcated process; passing said request to said second execution environment; and performing said request in said second execution environment.

7. The method of claim 6, where said step of determining that a request has been made by the debugger to access a context for said bifurcated process comprises:

verifying that said debugger has the required authorization with respect to said bifurcated process.

8. The method of claim 6, where said step of determining that a request has been made by the debugger to access a context for said bifurcated process comprises:

determining that a request has been made to access a context for said shadow process.

9. The method of claim 6, where said request comprises a request to get said context.

10. The method of claim 6, where said request comprises a request to set said context.

11. A method for facilitating the debugging of a bifurcated process by a debugger in a first execution environment, where said process is scheduled using a shadow process running in said first execution environment, and where said bifurcated process is executed using a work process running in a second execution environment, wherein said first execution environment comprises a scheduler being adapted to schedule and dispatch a plurality of first threads for execution on a first processor; and wherein said second execution environment is adapted to dispatch a plurality of second threads for execution on a second processor; said second execution environment being further adopted to request, for each of said second threads, creation of a corresponding one of said first threads, each of the first threads comprising an instruction to switch to said second execution environment with a request to invoke the first thread's corresponding second thread, said method comprising: determining that a request has been made by the debugger to perform a control operation on a thread of said bifurcated process; passing said request to said second execution environment; performing said request in said second execution environment.

12. The method of claim 11, where said step of determining that a request has been made by the debugger to perform a control operation on a thread of said bifurcated process comprises:

verifying that said debugger has the required authorization with respect to said bifurcated process.

13. The method of claim 11, where said control operation comprises passing a signal to said thread.

14. The method of claim 11 where said control operation comprises terminating said thread.

15. A method for facilitating the debugging of a bifurcated process by a debugger in a first execution environment, where said process is scheduled using a shadow process running in said first execution environment, and where said bifurcated process is executed using a work process running in a second execution environment, wherein said first execution environment comprises a scheduler being adapted to schedule and dispatch a plurality of first threads for execution on a first processor; and wherein said second execution environment is adapted to dispatch a plurality of second threads for execution on a second processor; said second execution environment being further adapted to request, for each of said second threads, creation of a corresponding one of said first threads, each of the first threads comprising an instruction to switch to said second execution environment with a request to invoke the first thread's corresponding second thread, said method comprising: receiving a debug event notification from said second execution environment relating to said work process; passing said debug event notification to said debugger.

16. A method for facilitating the debugging of a bifurcated process by a debugger in a first execution environment, where said process is scheduled using a shadow process running in said first execution environment and where said bifurcated process is executed using a work process running in a second execution environment, wherein said first execution environment comprises a scheduler being adapted to schedule and dispatch a plurality of first threads for execution on a first processor; and wherein said second execution environment is adapted to dispatch a plurality of second threads for execution on a second processor; said second execution environment being further adapted to request, for each of said second threads, creation of a corresponding one of said first threads, each of the first threads comprising an instruction to switch to said second execution environment with a request to invoke the first thread's corresponding second thread, said method comprising: detecting a request by the debugger to access process memory for said bifurcated process and passing said request to said second execution environment; detecting a request by the debugger to access a context for said bifurcated process and passing said request to said second execution environment; detecting a request by the debugger to perform a control operation on a thread of said bifurcated process and performing said request on in said first execution environment; and receiving a debug event notification from said second execution environment relating to said work process and passing said debug event notification to said debugger.

17. At least one of a computer readable storage medium having stored thereon a plurality of computer-executable instructions, or a computing device for performing the method of claim 16.

18. A computing system comprising: a first execution environment that comprises a scheduler, said first execution environment being adapted to schedule and dispatch a plurality of first threads for execution on a processor, said first execution environment being further adapted to detect a process memory request from a debugger in said first execution environment directed at a specific one of said first threads and to transmit said process memory request; a second execution environment that is adapted to dispatch a plurality of second threads for execution on said processor, said second execution environment being further adapted to request, for each of said second threads, creation of a corresponding one of said first threads, each of the first threads comprising an instruction to switch to said second execution environment with a request to invoke the first thread's corresponding second thread, said execution environment further adapted to receive said transmitted process memory request and perform the requested action on the specific one of said second threads corresponding to said specific one of said first threads.

19. The system of claim 18, wherein said first execution environment comprises a first operating system, and wherein said second execution environment comprises a second operating system.

20. The system of claim 18, wherein the first execution environment is expected to conform its behavior to a first specification, wherein said second execution environment is expected to conform its behavior to a second specification, and wherein the expectation that the second execution environment will behave according to the second specification is relatively greater than the expectation that the first execution environment will conform its behavior to the first specification.

21. The system of claim 18, further comprising a criterion that determines whether running the second thread would cause the second execution environment to behave in a manner that would violate the second specification.

22. A computing system comprising: a first execution environment that comprises a scheduler, said first execution environment to schedule and dispatch a plurality of first threads for execution on a processor, to detect a thread context request from a debugger in said first execution environment directed at a specific one of said first threads and to transmit said thread context request; a second execution environment to dispatch a plurality of second threads for execution on said processor, to request, for each of said second threads, creation of a corresponding one of said first threads, each of the first threads comprising an instruction to switch to said second execution environment with a request to invoke the first thread's corresponding second thread, said execution environment further to receive said transmitted thread context request and perform the requested action on the specific one of said second threads corresponding to said specific one of said first threads.

23. The system of claim 22, wherein said first execution environment comprises a first operating system, and wherein said second execution environment comprises a second operating system.

24. The system of claim 22, wherein the first execution environment is expected to conform its behavior to a first specification, wherein said second execution environment is expected to conform its behavior to a second specification, and wherein the expectation that the second execution environment will behave according to the second specification is relatively greater than the expectation that the first execution environment will conform its behavior to the first specification.

25. The system of claim 22, further comprising a criterion that determines whether running the second thread would cause the second execution environment to behave in a manner that would violate the second specification.

26. A computing system comprising: a first execution environment that comprises a scheduler, said first execution environment being adapted to schedule and dispatch a plurality of first threads for execution on a processor, said first execution environment being further adapted to receive a debug event notification for a debugger in said first execution environment attached to a process comprising one or more of said plurality of first threads; a second execution environment that is adapted to dispatch a plurality of second threads for execution on said processor, said second execution environment being further adapted to request, for each of said second threads, creation of a corresponding one of said first threads, each of the first threads comprising an instruction to switch to said second execution environment with a request to invoke the first thread's corresponding second thread, said execution environment further adapted to transmit said debug event notification to said first execution environment when a debug event occurs on one of said second threads corresponding one of said first threads of said process.

27. The system of claim 26, wherein said first execution environment comprises a first operating system, and wherein said second execution environment comprises a second operating system.

28. The system of claim 26, wherein the first execution environment is expected to conform its behavior to a first specification, wherein said second execution environment is expected to conform its behavior to a second specification, and wherein the expectation that the second execution environment will behave according to the second specification is relatively greater than the expectation that the first execution environment will conform its behavior to the first specification.

29. The system of claim 28, further comprising a criterion that determines whether running the second thread would cause the second execution environment to behave in a manner that would violate the second specification.

30. A method implemented at least in part by a computing device for debugging a process instantiated as a shadow thread and a work thread in first and second execution environments, respectively, wherein said first execution environment comprises a scheduler being adapted to schedule and dispatch a plurality of first threads for execution on a first processor; and wherein said second execution environment is adapted to dispatch a plurality of second threads for execution on a second processor; said second execution environment being further adapted to request, for each of said second threads, creation of a corresponding one of said first threads, each of the first threads comprising an instruction to switch to said second execution environment with a request to invoke the first thread's corresponding second thread, the method comprising:

a. attaching a debugger to the shadow thread in the first execution environment;

b. monitoring requests by the debugger; and c. forwarding the request to the second execution environment and perform the said request in the second environment to access a process state of the work thread.

31. At least one of a computer readable storage medium having stored thereon a plurality of computer-executable instructions, or a computing device for performing the method of claim 30.

* * * * *